United States Patent [19]
David et al.

[11] Patent Number: 5,907,601
[45] Date of Patent: May 25, 1999

[54] CALL PACING METHOD

[75] Inventors: John E. David, Fairfield; Paul Zmuda, Stratford, both of Conn.

[73] Assignee: EIS International Inc., Herndon, Va.

[21] Appl. No.: 09/045,708

[22] Filed: Mar. 23, 1998

Related U.S. Application Data

[63] Continuation-in-part of application No. 08/874,279, Jun. 13, 1997, which is a continuation of application No. 08/451,768, May 26, 1995, Pat. No. 5,640,445.

[51] Int. Cl.$^6$ .......................... H04M 15/00; H04M 3/00; H04M 5/00
[52] U.S. Cl. .................... 379/113; 379/265; 379/266; 379/309
[58] Field of Search .......................... 379/34, 112, 113, 379/265, 266, 309, 111

[56] References Cited

U.S. PATENT DOCUMENTS

| | | | |
|---|---|---|---|
| 4,800,583 | 1/1989 | Theis | 379/266 |
| 4,829,563 | 5/1989 | Crockett et al. | 379/309 |
| 4,881,261 | 11/1989 | Oliphant et al. | 379/265 |
| 4,933,964 | 6/1990 | Girgis | 379/265 |
| 5,023,868 | 6/1991 | Davidson | 379/112 |
| 5,025,468 | 6/1991 | Sikand | 379/309 |
| 5,179,589 | 1/1993 | Syu | 379/265 |
| 5,185,780 | 2/1993 | Leggett | 379/113 |
| 5,214,688 | 5/1993 | Szlam et al. | 379/112 |
| 5,295,184 | 3/1994 | Smith | 379/92 |
| 5,299,260 | 3/1994 | Shaio | 379/265 |
| 5,327,490 | 7/1994 | Cave | 379/216 |
| 5,327,491 | 7/1994 | Syu | 379/265 |
| 5,341,412 | 8/1994 | Ramot | 379/92 |
| 5,390,243 | 2/1995 | Casselman et al. | 379/265 |
| 5,436,965 | 7/1995 | Grossman | 379/266 |
| 5,463,685 | 10/1995 | Gaechter | 379/309 |
| 5,465,286 | 11/1995 | Clare et al. | 379/265 |
| 5,467,391 | 11/1995 | Donaghue et al. | 379/265 |
| 5,511,112 | 4/1996 | Aleksander Szlam | 379/266 |
| 5,544,220 | 8/1996 | Trefzger | 379/266 |
| 5,546,456 | 8/1996 | Vilsoet et al. | 379/265 |
| 5,553,133 | 9/1996 | Perkins | 379/266 |
| 5,561,711 | 10/1996 | Muller | 379/265 |
| 5,590,188 | 12/1996 | Crockett | 379/265 |
| 5,787,163 | 7/1998 | Taylor et al. | 379/265 |
| 5,844,980 | 12/1998 | Patel et al. | 379/266 |

*Primary Examiner*—Curtis A. Kuntz
*Assistant Examiner*—Rexford N. Barnie
*Attorney, Agent, or Firm*—Lane, Aitken & McCann

[57] ABSTRACT

A "look-ahead" calculation projects what would be the effect on the abandon rate if several additional abandons happened to occur. The method uses the result of this "look-ahead" calculation of a projected abandon rate to modify its estimation of the number of ringing dials that will or will not result in an answer. If the projected abandon rate indicates the abandon rate is sensitive to an increase in the number of abandons, the method increases the estimate of those ringing calls which are likely to answer by up to two and one-half times the "average", depending on the degree of sensitivity. If the sensitivity forecasts little danger of exceeding the set abandon rate, the method decreases the estimate of ringing calls that will answer by up to one-half. In the former case, dialing is slowed down and in the latter, dialing is speeded up. Both cases have the advantage to "looking ahead" rather than simply reacting to events that may not be quickly correctable once they have occurred.

11 Claims, 3 Drawing Sheets

CALL PACING METHOD

RELATED INVENTION

This invention is a continuation in part of application Ser. No. 08/874,279 filed Jun. 13, 1997 which is a continuation of application Ser. No. 08/451,768 filed May 26, 1995 now U.S. Pat. No. 5,640,445.

BACKGROUND OF THE INVENTION

Field of the Invention

This invention relates to an improved call pacing method for a call center outbound automatic dialing function and more particularly to a pacing method capable of holding to low set abandon rates.

U.S. Pat. No. 5,640,445, which is incorporated herein by reference, discloses a call pacing method in which agent availability and call answers are based on probability statistics. For the agent availability determination, a weight is assigned each agent engaged in a call or in after-call work. This weight is a function of how long an agent has been engaged in a call or in after-call work and the length of an adjustable time window. The sum of the weights is a predicted number of engaged agents that will become free. The length of the time window, which is typically not the same for agents engaged in a call and agents engaged in after-call work, is not explicitly dependent on the interval between the dial of a call and when the call is expected to be answered. The time window is adjusted by the system; lengthened when the abandon call rate falls below the maximum acceptable ratio (herein referred to as the set abandon rate) and shortened when the set abandon rate rises above the set abandon rate.

Calls to be dialed may be separated into classes based on the probability that a dialed call will be answered (e.g. previously dialed, busy responses will have a higher probability of answer than a previously dialed no answer response). Separate data of answer vs. dials are kept for each class. Dialed calls that remain unanswered are further discounted as the unanswered status extends in time and the data indicates a diminished probability of being answered.

For each class, a number of calls to dial is calculated, based on the probability of an answer, in order to provide answered calls for the predicted number of idle agents without the predicted number of abandons exceeding the allowable or set abandon rate (as used herein, the phrase "predicted idle agents" includes engaged agents predicted to become available plus presently idle agents). Calls to dial are calculated from the various classes, starting with the class with the highest probability of an answer, so that the fewest dials are used to produce the required number of answered calls. For each class, the calculation of the number of calls to dial is based on an assumed binomial distribution of the likelihood of a given number of answers if the predicted number of idle agents divided by class answer probability is less than a predetermined number; if larger than this number a normal distribution is used for ease of calculation.

The pacing method of the U.S. Pat. No. 5,640,445 patent gains a significant performance advantage by estimating the proportion of ringing dials that will not result in an answer. It then begins dialing new calls to substitute for these calls. It uses an "average" estimation calculation for the number of ringing dials which will not answer, which is adequate for abandon rates in the neighborhood of 5.0 percent, but has not been altogether satisfactory for very low set abandon rates, e.g., 0.5 percent. This is because with a low set abandon rate, there is very little room for the errors ("error distribution") that an "average" estimator will usually produce. Low set abandon rates of 0.5 percent involve at most one abandoned call for every 200 answers, in contrast to one abandoned call for every 20 answers for the higher rate of 5.0 percent.

Prior art pacing methods, including the U.S. Pat. No. 5,640,445 pacing method, use only an "after-the-fact" control mechanism; that is, the method slows down the rate of dialing once the set abandon rate is exceeded. However, due to the very small margin for error with low set abandon rates, this "after the fact" mechanism is not satisfactory. This same "after the fact" mechanism is also used to speed up the dialing, if the abandon rate is too low, which can also cause unwanted effects for low set abandon rates.

An object of this invention is to provide an improved pacing algorithm which precisely maintains a set abandon rate, even low set abandon rates and even in an environment where the talk time is long.

Briefly this invention contemplates the provision of a "look-ahead" calculation, that projects what would be the effect on the abandon rate if several additional abandons happened to occur. This could be characterized as estimating the abandon rate sensitivity. The method uses the result of this "look-ahead" calculation of a projected abandon rate to modify its estimation of the number of ringing dials that will or will not result in an answer. If the projected abandon rate indicates the abandon rate is sensitive to an increase in the number of abandons, the method increases the estimate of those ringing calls which are likely to answer by up to two and one-half times the "average", depending on the degree of sensitivity. If the sensitivity forecasts little danger of exceeding the set abandon rate, the method decreases the estimate of ringing calls that will answer by up to one-half. In the former case, dialing is slowed down and in the latter, dialing is speeded up. Both cases have the advantage to "looking ahead" rather than simply reacting to events that may not be quickly correctable once they have occurred.

In a preferred embodiment, the method of this invention uses the mathematically-based Binomial algorithm of the U.S. Pat. No. 5,640,445 patent to estimate how many calls are safe to dial, which is most accurate when there are no or few dials ringing. When there are few dials ringing, the "look-ahead" calculation has little effect. In this case, the Binomial algorithm exercises the most control on the dialing rate, which is precisely when it is most accurate. When there are many dials in progress, the "look-ahead" calculation gains more control, as it should.

BRIEF DESCRIPTION OF THE DRAWINGS

The foregoing and other objects, aspects and advantages will be better understood from the following detailed description of a preferred embodiment of the invention, in which.

DETAILED DESCRIPTION OF A PREFERRED EMBODIMENT

Figure 1:
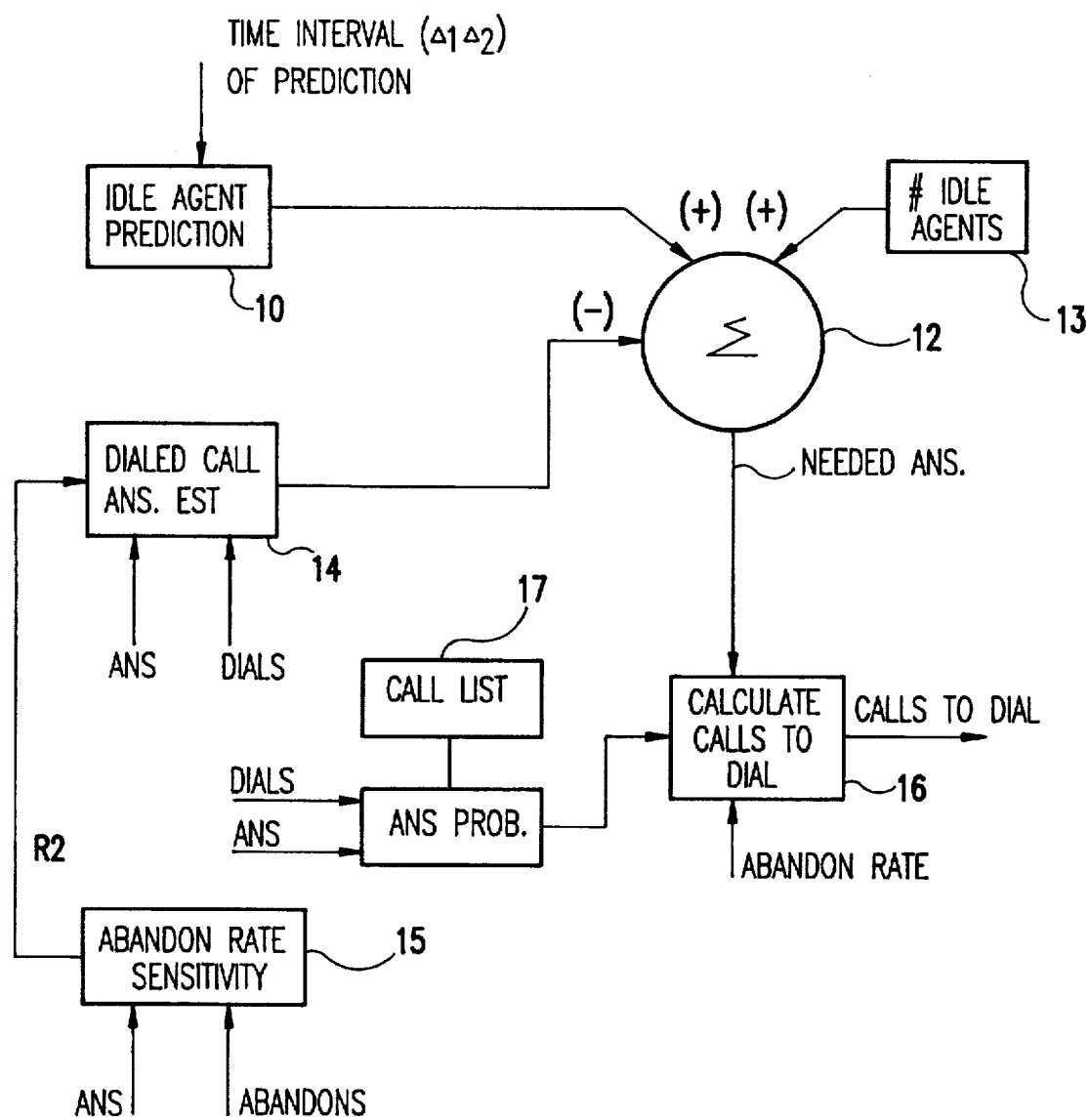
FIG. 1 is a functional block diagram of one embodiment of the elements of the pacing algorithm in accordance with the teachings of this invention.
Figure 2:
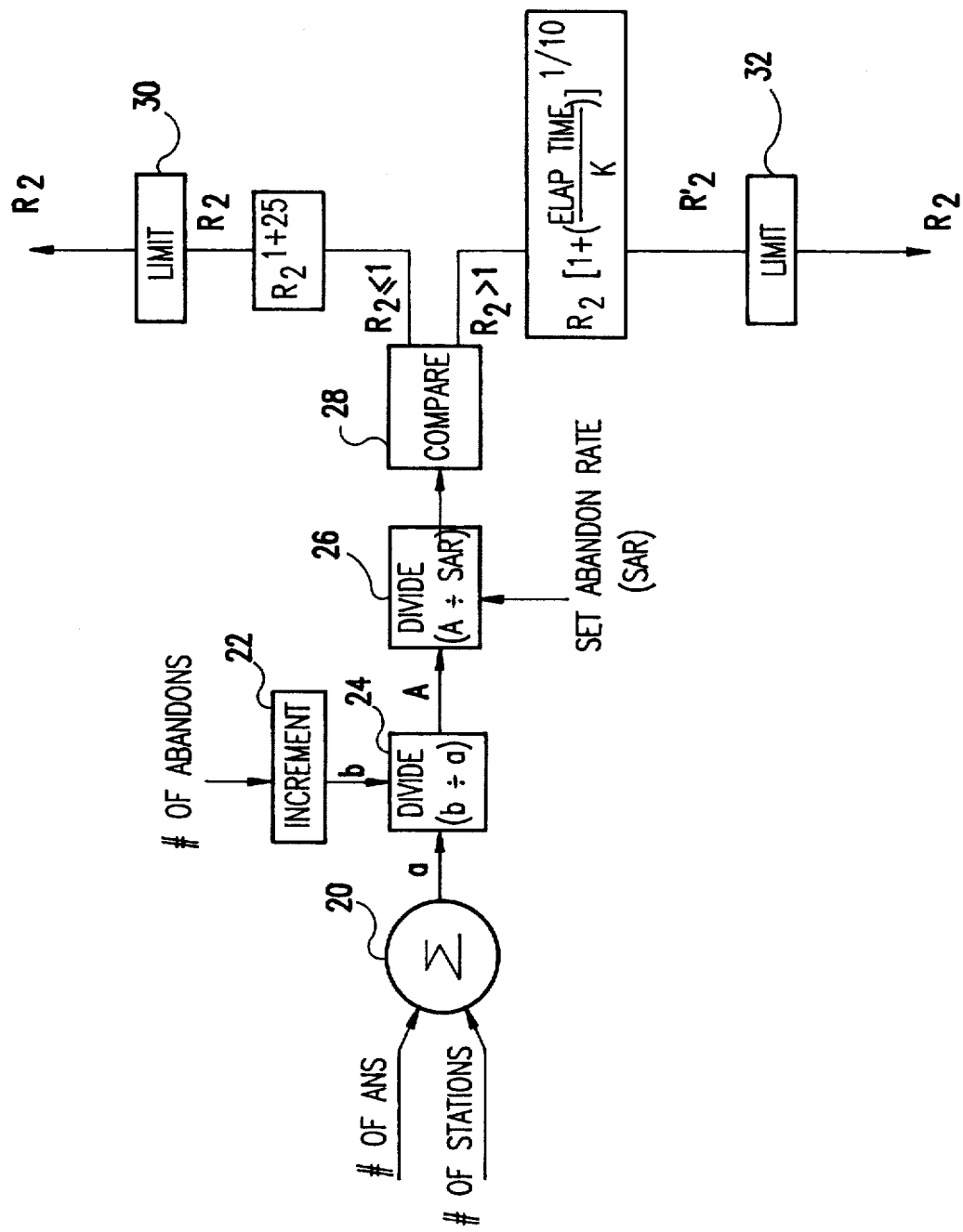
FIG. 2 is a functional block diagram of one exemplary embodiment of the algorithm to determine abandon rate sensitivity in accordance with the teachings of this invention.

It will be appreciated that many of the elements shown here in FIG. 1 are simplified versions of the elements shown in FIG. 2 of U.S. Pat. No. 5,640,445 and explained in that patent to which reference may be made for a detailed explanation. Referring now to FIG. 1, it illustrates functionally the operations performed in accordance with the teachings of the invention to determine a number of calls to dial. These operations provide a method to automatically dial from a list of telephone numbers for the purpose of connecting answers to a group of stations, subject to constraint. The constraint is that the ratio of unconnected answers, due to lack of free stations (i.e. so-called abandons or nuisance calls) to all answers cannot be more than a certain predefined ratio. This value is referred to herein as the maximum allowable, or set abandon rate and is also known as the maximum nuisance call rate. This method takes into account the variability of both the time it takes for a call to answer and the time an agent station spends connected and in after-call work. Using a probability distribution, the method attempts to match the number of answers to the number of available agents within the abandon rate constraint.

A number of calls to dial is calculated periodically, for example, once every second. In connection with each calculation, an idle agent prediction routine 10 predicts the number of agents engaged in a call or in after-call work that will become idle within a time window $\Delta_1$. For each agent engaged in a call, or in after-call work, the elapsed time from the start of that call or the start of after-call work, is monitored by a call manager. In addition, statistical data of elapsed time from call start to actual call completion for all agents and from start of after-call work until complete and available for a call is maintained and updated. From this data for all agents, a probability that each agent's call will terminate in a time interval $\Delta_1$ for calls in progress or $\Delta_2$ for after-call work subsequent to the current time is calculated, and a total number of agents predicted to be available is based on a sum of predictive weights calculated from each probability using a logarithmic formula. The intervals $\Delta_1$ or $\Delta_2$ can be independently increased or decreased. Increasing either increase the rate at which calls are dialed, and decreasing either decrease the rate. The output of this agent prediction routine unit 10 is coupled logically as one input to a summing junction 12. Another logical input of the summing junction is the number of agents actually idle 13. The sum of the number of predicted idle agents and the actual idle agents is the number of answers required to keep the agents busy.

A dialed call routine 14 predicts the number of calls that will be answered from among the calls that have been dialed, but for which there has been no answer at the time of the predictive calculation. A call manager maintains data showing dials and answers and intervals from dial to answer for all calls in each class of calls. From this data, a probability is calculated. This probability $R_1$ is the sum of the probabilities that each incomplete dialed call will be answered. An "incomplete call" as used herein means a call which has been dialed but for which no result (i.e. answer, busy, etc.) has been received by the dialer. The predicted number of answered calls is the number of incomplete calls times $R_1$. The output of the call routine 14 is the number of expected answers for incomplete calls accounting for the lessening probability that a call will be answered the longer it is incomplete. The discount routine 14 sums the probabilities of each call being answered, and this sum is the predicted number of answers for dialed incomplete calls. The output of discount routine 14 is subtracted at summing junction 12 from the number of answers required. The logical output of summing junction 12 is the number of answered calls required (over and above the expected answers from calls already dialed) to keep busy any presently idle agents and agents predicted to be idle. As no-answers take longer to arrive than the answers, simply recording the result of each dial, either an answer or no-answer, at the time it happened, using the resulting ratio of answers to dials to determine the answer rate, can lead to an underestimate of the true value of the answer rate and as a consequence, initial over-dialing. In accordance with this invention, a small sample size is used, for example 20 dials. Routine 14 waits until all 20 dials have registered their result, either an answer or no-answer, before updating the answer rate. Initial values are reduced proportionately as each sample is recorded. The data which store the time it takes for the respective results to occur, also are only updated once a complete sample has been taken.

As will be explained in more detail in connection with FIG. 2, a projected abandon rate routine 15 in effect increases or decreases (or leaves unchanged) the probability that a dialed call will be answered depending on the sensitivity or insensitivity of the abandon rate to a increase in the number of abandons. Each time a sample is completed, the projected abandon rate routine 15 estimates what would be the effect on the abandon rate if several additional abandons occurred. It then uses this "look-ahead" calculation to modify the estimation of the number of ringing dials that will result in an answer. If the projected abandon rate is greater than the set abandon rate, the output of the projected abandon rate function 15 increases the estimate of the number of those ringing calls which are likely to answer by up to two and one-half times the number estimated by the dialed call estimate function 14. If the projected abandon rate forecasts little danger of exceeding the set abandon rate, routine 14 decreases its estimate of ringing calls that will answer by up to one-half. In the former case, dialing is slowed down and in the latter, dialing is speeded up.

A number of calls to dial routine 16 calculates the number of calls to dial for each class using an assumed probability distribution of answers versus dials. A binomial distribution is used if the number of required answers divided by the probability of an answer for that class is equal to or less than the number of predicted and actual idle agents. An assumed normal distribution is used if the number is greater than that. The number of dialed calls is calculated so the predicted number of answers equals the number of required answers without exceeding the set abandon rate (i.e. the maximum abandon rate). The call manager maintains separate statistics of the ratio of answered calls to dialed calls for each of several different classes of calls; for example freshly dialed calls; previously dialed calls that resulted in a busy response; previously dialed calls which were not answered and rescheduled calls. Each of these classes can be expected to have a different probability that a dialed call will result in an answer and hence for each class a number of calls to dial is calculated based on the class answer probability. For each class, there is a list 17 of telephone numbers available for dialing. The number of answers and the number of calls dialed are kept by the call manager and used as inputs to the routine 16.

The system retains, in the preferred embodiment, the mathematically-based Binomial algorithm of U.S. Pat. No. 5,640,445 patent, in calculating a number of calls to dial. The system of this invention varies two parameters in order to maintain the set abandon rate. It varies the predicted number of agents to become idle, and the predicted number of dialed calls that will be answered. The Binomial algorithm routine 16 accurately estimates how many calls are safe to dial when there are no or few incomplete calls. When there are few incomplete calls, the projected abandon rate routine 15 has little effect. In this case, the Binomial algorithm exercises the most control on the dialing rate, which is precisely when it is most accurate. When there are many calls in progress, the "look-ahead" calculation gains influence.

Referring now to FIG. 2, the predicted abandoned rate is determined by incrementing the actual number of abandon calls by a predetermined number and determining the effect of this incremental change on the abandon rate. In a preferred embodiment of the invention, the projected abandon rate is:

$$\text{projected abandon rate} = \frac{\text{No. of abandon calls + small number}}{\text{No. of ans. + No. of agent stations}}$$

In order to determine the abandoned rate sensitivity to additional abandoned calls, a summing injunction 20 sums the number of answers received from the start a call campaign to the time of the calculation and adds the number of agent stations assigned to the campaign. An incrementing function 22 increments the total number of abandons during the call campaign to the time of the calculation by a predetermined number, for example it adds 2 abandons to the actual number of abandons. A function 24 divides this incremented number of abandons "b" by the sum of the number of answers and the number of stations "a". This provides the projected abandon rate output "A." A function 26 divides the output "A" of the previous operation by the set abandon rate (i.e., the maximum allowable abandon rate) to quantify the effect of additional abandon calls on the abandon rate. A comparator 28 compares the output "$R_2$" of functional unit 26 to determine whether or not this value "$R_2$" is less than or equal to 1; or if it is greater than 1. If the value $R_2$ is less than or equal to 1, the value $R_2$ is raised to a power, for example, to the power 1.25 ($R_2^{1.25}$). A limit 30 is set on this raised value ($R_2^{1.25}$), for example, a limit value of 0.5. Here it will be appreciated that if the projected abandon rate A is equal to or less than the set abandon rate, the predicted number of answered calls from calls already dialed (i.e. $R_1 \times R_2^{1.25}$) will be decreased and the number of calls to be dialed will be correspondingly increased. The amount of decrease is a function of the ratio of the abandon rate to the set abandon rate with a limit in this example 0.5 as the limit.

If the value of $R_2$ is greater than 1, the value of $R_2$ is multiplied by a factor related to the elapsed time of the call campaign in seconds, where the elapsed time is measured from the time the first call is dialed. In a specific embodiment of the invention, the factor is:

$$R_2' = R_2 \left[ 1 + \left( \frac{\text{elapsed time}}{K} \right) \right]^{\frac{1}{10}}$$

where K=1800
A limit 32 is set on this value of $R'_2$ when $R_2$, for example a limit of 2.5. Again it will be appreciated that if the projected abandon rate A is greater than the set abandon rate, the predicted number of answered calls from calls already dialed (i.e. $R_1 \times R'_2$) will increase, and the number of calls to be dialed will be correspondingly decreased.

Figure 3:
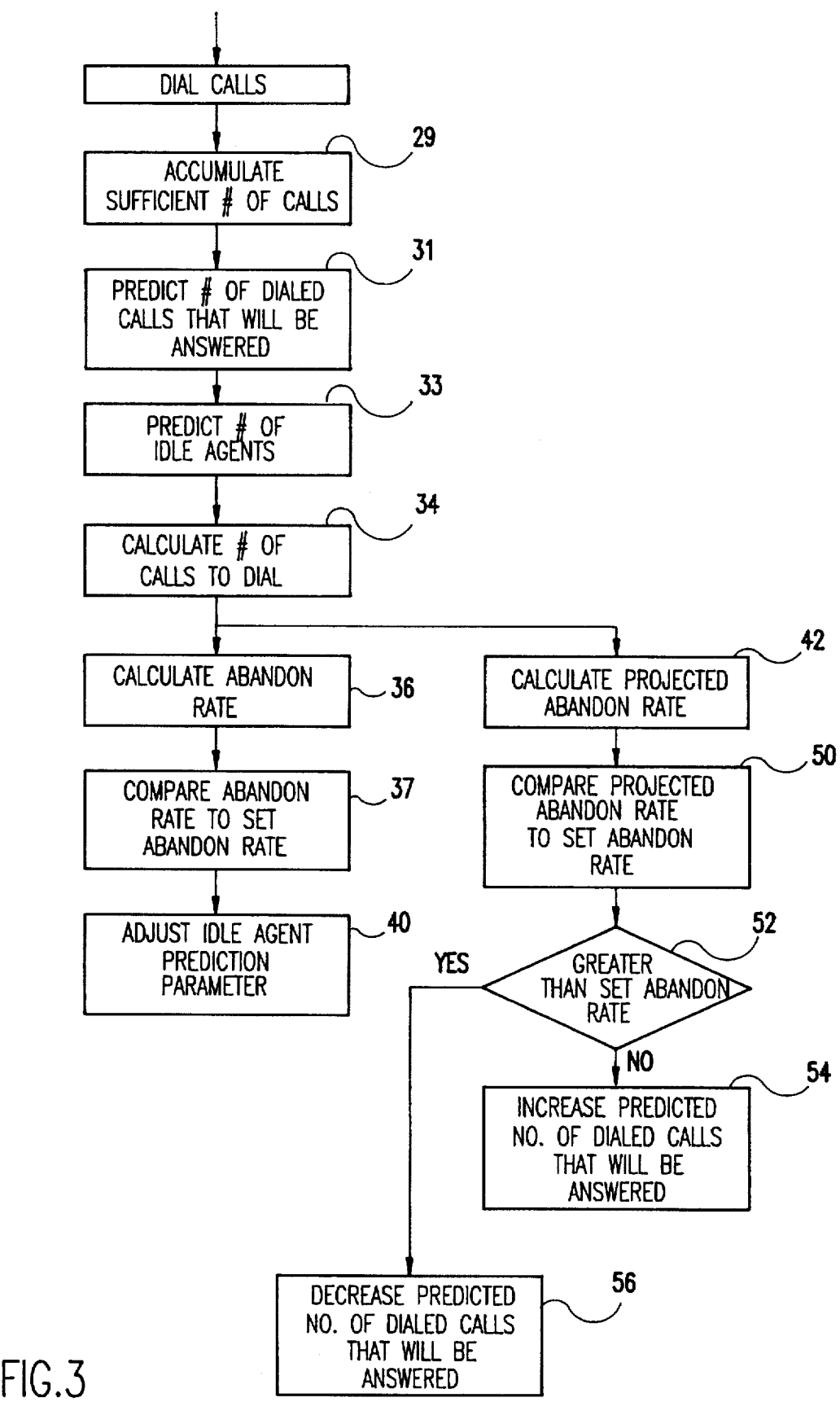
FIG. 3 is a flow diagram of the call pacing method in accordance with one embodiment of this invention.

Referring now to FIG. 3, it shows a simplified flow diagram of the method steps in accordance with one specific embodiment of the invention. The method waits at block 29, until a sufficient number of answers have been received and then predicts a number of dialed calls that will be answered, block 31. The method also predicts the number of agents that will be idle, block 33. Based on the number of dialed calls predicted to be answered and a predicted number of idle agents, it calculates the number of calls to dial, block 34. The abandon rate is determined in block 36, and compared to the set abandon rate, block 37. If the actual abandon rate is above or below the set abandon rate, the parameter (Δ) which is used to predict the number of idle agents is changed, block 40.

The projected abandon rate is calculated at block 42 and compared to the set abandon rate, block 50. If the projected abandon rate is greater than the set abandon rate, block 52, the parameter used to predict the number of dialed but incomplete calls that will be answered is changed to increase the number of dialed calls predicted to be answered, block 54. Here it will be appreciated, the effect will be to reduce the rate at which calls are dialed. If the projected abandon rate is less than the set abandon rate, the parameter is changed to decrease the number of dialed, incomplete calls predicted to be answered, block 56. Again, it will be appreciated, the effect will be to increase the rate at which calls are dialed.

While the invention has been described in terms of a single preferred embodiment, those skilled in the art will recognize that the invention can be practiced with modification within the spirit and scope of the appended claims.

Having thus described our invention, what we claim as new and desired to secure by letters patent is as follows:

1. A method for determining a number of calls to dial in order to connected answered calls to available agents while maintaining a ratio answered calls for which no agent is available to answered calls or which an agent is available (the abandon rate) at a predetermined value, comprising the steps of:

predicting a number of agents that will be idle at the end of a future time interval;

predicting a number of calls to be dialed that will be answered based on data relating a number of past answers to a number of past dialed calls;

predicting a number of calls that have been dialed that will be answered;

calculating a projected abandon rate using an incremented number of abandoned calls;

comparing the projected abandon rate to said preset value to determine whether said look ahead abandon rate will exceed said preset value;

reducing the number of calls predicted to be answered in said predicting step if said projected abandon rate exceeds said preset value by a predetermined amount.

2. A method as in claim 1 including the further step of increasing the number of calls predicted to be answered in said predicting step if said projected abandon rate is less than said preset value by a predetermined amount.

3. A method as in claim 1 wherein the step of predicting a number of calls that have been dialed that will be answered accumulates a predetermined number of answered calls before making a prediction.

4. A method as in claim 1 including the farther steps of comparing the abandon rate to said preset value and changing a parameter used in the step of predicting a number of agents that will be idle if the abandon rate exceeds said preset value.

5. A method as in claim 2 including the further steps of comparing the abandon rate to said preset value and changing a parameter used in the step of predicting a number of agents that will be idle if the abandon rate is less than said preset value.

6. A method as in claim 2 wherein the step of predicting a number of calls that have been dialed that will be answered accumulates a predetermined number of answered calls before making a prediction.

7. A method as in claim 6 including the further steps of comparing the abandon rate to said preset value and changing a parameter used in the step of predicting a number of agents that will be idle if the abandon rate exceeds said preset value.

8. A method as in claim 1 wherein said increasing step includes reducing said number of calls predicted to be answered by a factor that includes the ratio of the projected abandon rate to the set value raised to a power.

9. A method as in claim 8 wherein said power is equal to 1.25.

10. A method as in claim 2 wherein said increasing step includes reducing said number of calls predicted to be answered by a factor that includes the ratio of the projected abandon rate to the set value multiplied by a factor that includes the total elapsed time from the first placed call raised to a power.

11. A method as in claim 10 wherein said power is one tenth.

* * * * *